United States Patent
Kupratis

(10) Patent No.: US 12,331,689 B2
(45) Date of Patent: Jun. 17, 2025

(54) LOW PRESSURE COMPRESSOR CONTROL FOR A GAS TURBINE ENGINE

(71) Applicant: RAYTHEON TECHNOLOGIES CORPORATION, Farmington, CT (US)

(72) Inventor: Daniel Bernard Kupratis, Wallingford, CT (US)

(73) Assignee: RTX CORPORATION, Farmington, CT (US)

( * ) Notice: Subject to any disclaimer, the term of this patent is extended or adjusted under 35 U.S.C. 154(b) by 199 days.

(21) Appl. No.: 18/072,336

(22) Filed: Nov. 30, 2022

(65) Prior Publication Data

US 2023/0089700 A1    Mar. 23, 2023

Related U.S. Application Data

(62) Division of application No. 16/656,206, filed on Oct. 17, 2019, now Pat. No. 11,566,567.
(Continued)

(51) Int. Cl.
*F02C 7/36* (2006.01)
*B64D 27/24* (2006.01)
(Continued)

(52) U.S. Cl.
CPC ............... *F02C 7/36* (2013.01); *B64D 27/24* (2013.01); *F01D 15/02* (2013.01); *F01D 15/10* (2013.01);
(Continued)

(58) Field of Classification Search
CPC .. F02C 3/107; F02C 3/113; F02C 7/36; F02C 9/00–9/58; B64D 27/24; B64D 27/30;
(Continued)

(56) References Cited

U.S. PATENT DOCUMENTS 6,176,074 B1 * 1/2001 Thompson ............... F02C 9/46
60/773
8,853,878 B1  10/2014 White
(Continued)

FOREIGN PATENT DOCUMENTS

| EP | 2233721 | 9/2010 |
| EP | 2728140 | 5/2014 |
| GB | 2550397 | 11/2017 |

OTHER PUBLICATIONS

European Patent Office, European Partial Search Report dated Apr. 14, 2020 in Application No. 19213957.4.
(Continued)

*Primary Examiner* — Loren C Edwards
(74) *Attorney, Agent, or Firm* — SNELL & WILMER L.L.P.

(57) ABSTRACT

A gas turbine engine includes a low speed spool mechanically interconnecting a low pressure turbine and at least one of a fan and a prop, a high speed spool mechanically interconnecting a high pressure turbine and a high pressure compressor, and an epicyclic gear system mechanically coupled to the high speed spool. The gas turbine engine also includes a low pressure compressor mechanically coupled to the high speed spool via the epicyclic gear system. The low pressure compressor may be mechanically independent of the low speed spool. The gas turbine engine may include a plurality of motor-generators for transferring power between the high speed spool and the low pressure compressor.

14 Claims, 12 Drawing Sheets

Related U.S. Application Data

(60) Provisional application No. 62/777,584, filed on Dec. 10, 2018.

(51) Int. Cl.
   *F01D 15/02* (2006.01)
   *F01D 15/10* (2006.01)
   *H02K 7/116* (2006.01)
   *H02K 7/18* (2006.01)

(52) U.S. Cl.
   CPC .................. *F05D 2220/76* (2013.01); *F05D 2260/40311* (2013.01); *H02K 7/116* (2013.01); *H02K 7/1823* (2013.01)

(58) Field of Classification Search
   CPC ........ B64D 27/31; B64D 27/32; B64D 27/33; B64D 27/34; B64D 27/35; B64D 27/351; B64D 27/353; B64D 27/359; B64D 31/18; B64D 35/021–025; F01D 15/02; F01D 15/10; F05D 2220/76; F05D 2260/40311; F05D 2270/023; F05D 2270/304; H02K 7/116; H02K 7/1823
   See application file for complete search history.

(56) References Cited

U.S. PATENT DOCUMENTS

| | | | |
|---|---|---|---|
| 9,915,164 | B2 | 3/2018 | Roberge |
| 10,094,295 | B2 | 10/2018 | Ullyott et al. |
| 2010/0154383 | A1* | 6/2010 | Ress, Jr. .................. F02C 7/36 60/226.3 |
| 2010/0223904 | A1 | 9/2010 | Edwards |
| 2011/0056208 | A1 | 3/2011 | Norris et al. |
| 2016/0061053 | A1* | 3/2016 | Thomassin .............. F02C 7/32 415/69 |
| 2018/0266329 | A1 | 9/2018 | Mackin |

OTHER PUBLICATIONS

European Patent Office, European Search Report dated Jul. 21, 2020 in Application No. 19213957.4.
USPTO; Requirement for Restriction dated Nov. 5, 2021 in U.S. Appl. No. 16/656,206.
USPTO; Preinterview First Office Action dated Mar. 24, 2022 in U.S. Appl. No. 16/656,206.
USPTO; First Action Interview Office Action dated May 17, 2022 in U.S. Appl. No. 16/656,206.
USPTO; Notice of Allowance dated Sep. 8, 2022 in U.S. Appl. No. 16/656,206.
USPTO; Corrected Notice of Allowance dated Nov. 23, 2022 in U.S. Appl. No. 16/656,206.

* cited by examiner

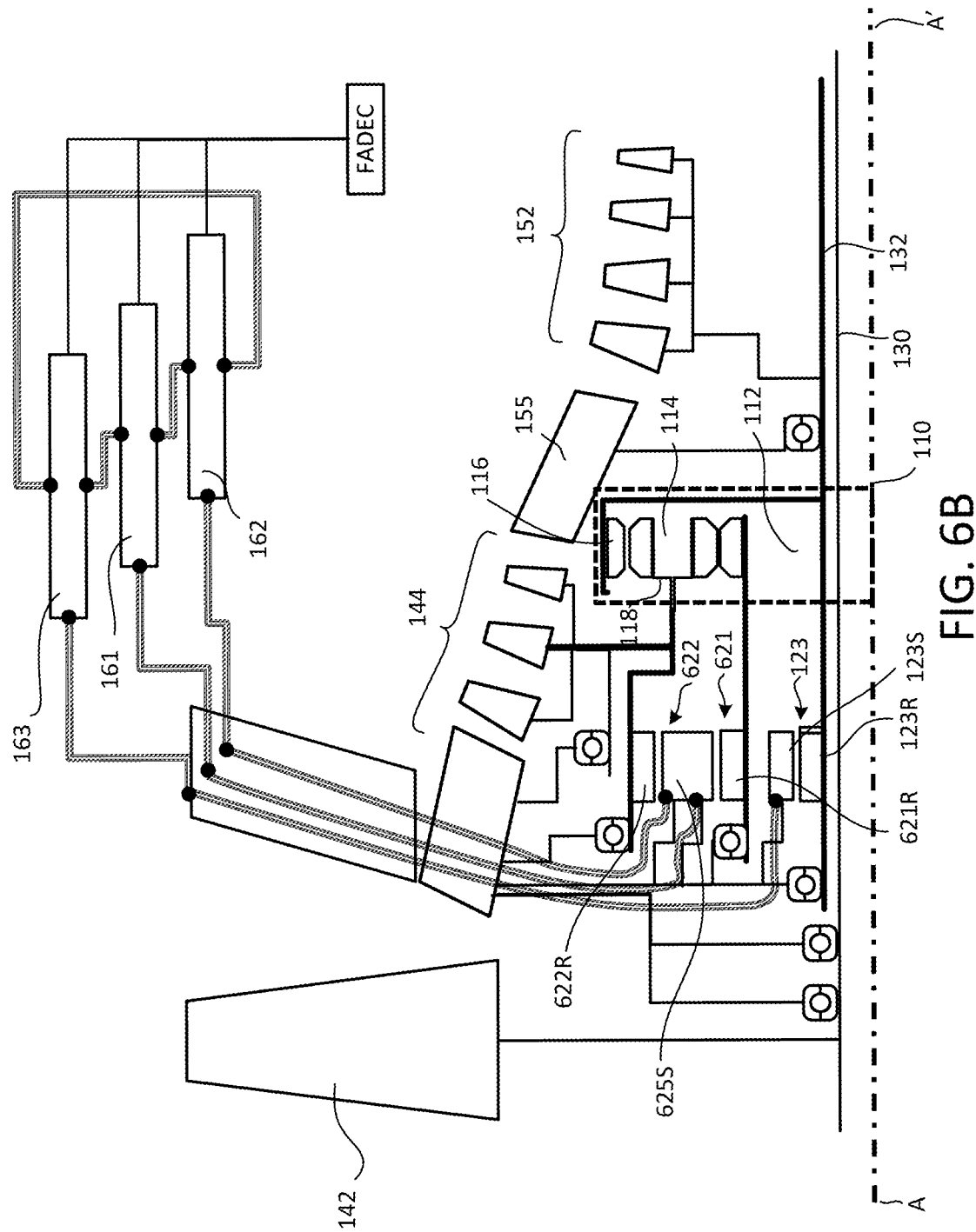

LOW PRESSURE COMPRESSOR CONTROL FOR A GAS TURBINE ENGINE

CROSS-REFERENCE TO RELATED APPLICATIONS

This application is a division of, and claims priority to and the benefit of, U.S. Non-Provisional patent application Ser. No. 16/656,206, filed on Oct. 17, 2019, and entitled "LOW PRESSURE COMPRESSOR CONTROL FOR A GAS TURBINE ENGINE." The '206 application claims priority to and the benefit of U.S. Provisional Patent Application Ser. No. 62/777,584, filed on Dec. 10, 2018, and entitled "LOW PRESSURE COMPRESSOR CONTROL FOR A GAS TURBINE ENGINE." Both of which are incorporated herein by reference in their entirety for all purposes.

FIELD

The present disclosure relates to gas turbine engines, and more specifically to using electric machines to control operation of gas turbine engines.

BACKGROUND

Conventional two-spool gas turbine engines (e.g., two-spool turbofan engines) typically include a low pressure compressor configured to be rotated by a low pressure turbine via a low speed spool, and a high pressure compressor configured to be rotated by a high pressure turbine via a high speed spool. In such conventional engines, transient engine power demands may cause one of the spools, and the associated rotors, to operate away from an optimal operating condition. For example, a rotational speed of a high speed spool operating at a high power condition (take-off) may involve operating the low speed spool at a speed that is suboptimal for purposes of efficiency. Thus, conventional two-spool gas turbine engines often sacrifice thrust and/or efficiency due to competing operating speed demands of the two spools.

SUMMARY

In various embodiments, the present disclosure provides a gas turbine engine that includes a low speed spool mechanically interconnecting a low pressure turbine and at least one of a fan and a prop, a high speed spool mechanically interconnecting a high pressure turbine and a high pressure compressor, and an epicyclic gear system mechanically coupled to the high speed spool. Further, the gas turbine engine includes a low pressure compressor mechanically coupled to the high speed spool via the epicyclic gear system, according to various embodiments.

In various embodiments, the low pressure compressor is mechanically independent of the low speed spool. In various embodiments, the epicyclic gear system comprises a sun gear, a ring gear, a plurality of planet gears, and a gear carrier coupled to the plurality of planet gears, wherein the plurality of planet gears are disposed between the sun gear and the ring gear. The high speed spool may be mechanically coupled to the ring gear and the low pressure compressor may be mechanically coupled to the gear carrier. In various embodiments, the gas turbine engine further includes a plurality of motor-generators mechanically coupled to at least one of the high speed spool and the epicyclic gear system. For example, a first motor-generator may be mechanically coupled to the sun gear, a second motor-generator may be mechanically coupled to the gear carrier, and a third motor-generator may be mechanically coupled to the high speed spool.

In various embodiments, the first motor-generator comprises a first rotor winding and a first stator winding, the third motor-generator comprises a third rotor winding and a third stator winding, and the first stator winding and the third stator winding are radially adjacent to each other such that the first stator winding and the third stator winding are electromagnetically synced. In various embodiments, the first stator winding and the third stator winding are integrated into a single stator winding. In various embodiments, the first motor-generator comprises a first rotor winding and a first stator winding, the second motor-generator comprises a second rotor winding and a second stator winding, and the first stator winding and the second stator winding are radially adjacent to each other such that the first stator winding and the second stator winding are electromagnetically synced. In various embodiments, the first stator winding and the second stator winding are integrated into a single stator winding.

The plurality of motor-generators may be electronically coupled to a controller, or each motor-generator may be coupled to a respective controller of a plurality of controllers. The plurality of controllers may be electronically coupled to a full authority digital electronic control (FADEC) system of an aircraft. In various embodiments, the epicyclic gear system is forward of a bearing of a vane that is disposed between the low pressure compressor and the high pressure compressor. In various embodiments, the gas turbine engine further includes a plurality of motor-generators mechanically coupled forward of the epicyclic gear system to at least one of the high speed spool and the epicyclic gear system.

Also disclosed herein, according to various embodiments, is an aircraft electrical network of a gas turbine engine. The aircraft electrical network may include a first motor-generator mechanically coupled to a first member of an epicyclic gear system, a second motor-generator mechanically coupled to a second member of the epicyclic gear system, and a third motor-generator mechanically coupled to a high speed spool of the gas turbine engine. Further, the aircraft electrical network may include a controller in electronic control communication with the first motor-generator, the second motor-generator, and the third motor-generator.

In various embodiments, a low pressure compressor of the gas turbine engine is mechanically coupled to the high speed spool of the gas turbine engine via the epicyclic gear system. In various embodiments, the controller comprises a first motor-generator controller electronically coupled to the first motor-generator, a second motor-generator controller electronically coupled to the second motor-generator, and a third motor-generator controller electronically coupled to the third motor-generator.

Also disclosed herein, according to various embodiments, is a method of operating a gas turbine engine. The method may include determining a first operating speed of a high speed spool of the gas turbine engine. The method may also include, based on the first operating speed (and the rate of change of the first operating speed), controlling a second operating speed (and an associated rate of change) of a low pressure compressor of the gas turbine engine, wherein the low pressure compressor is mechanically independent of a low speed spool of the gas turbine engine.

The forgoing features and elements may be combined in various combinations without exclusivity, unless expressly indicated herein otherwise. These features and elements as

BRIEF DESCRIPTION OF THE DRAWINGS

FIG. 6B is a schematic cross-sectional view of a gas turbine engine, in accordance with various embodiments;

Figure 1:
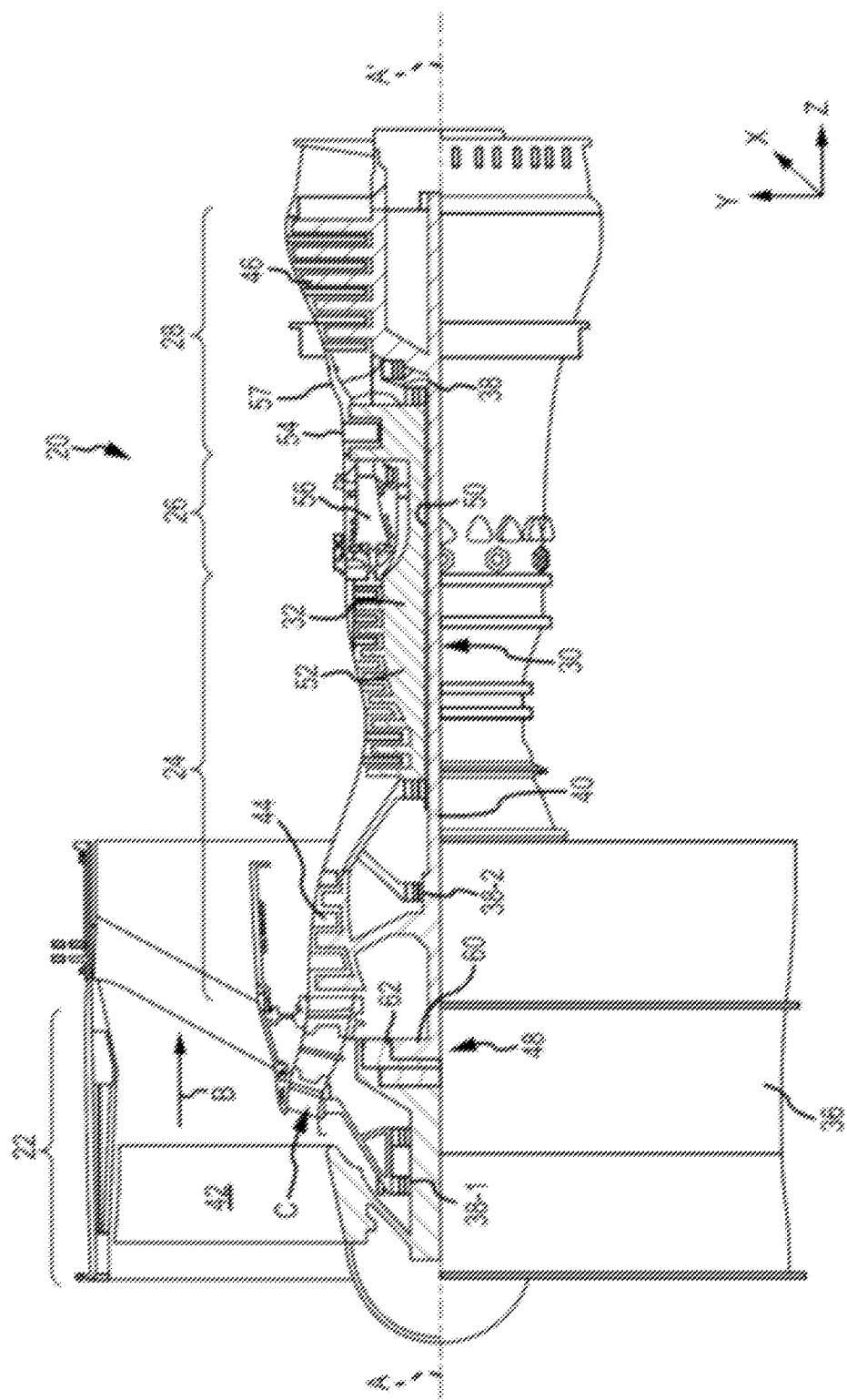
FIG. 1 is a cross-sectional view of a typical gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a system that utilizes electric machines, referred to herein as motor-generators, to improve the operating efficiency of a two-spool gas turbine engine. Also disclosed herein, according to various embodiments, is a low pressure compressor configuration that improves the operating efficiency of a two-spool gas turbine engine.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to radial directions and the x direction on the provided xyz axis refers to the circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
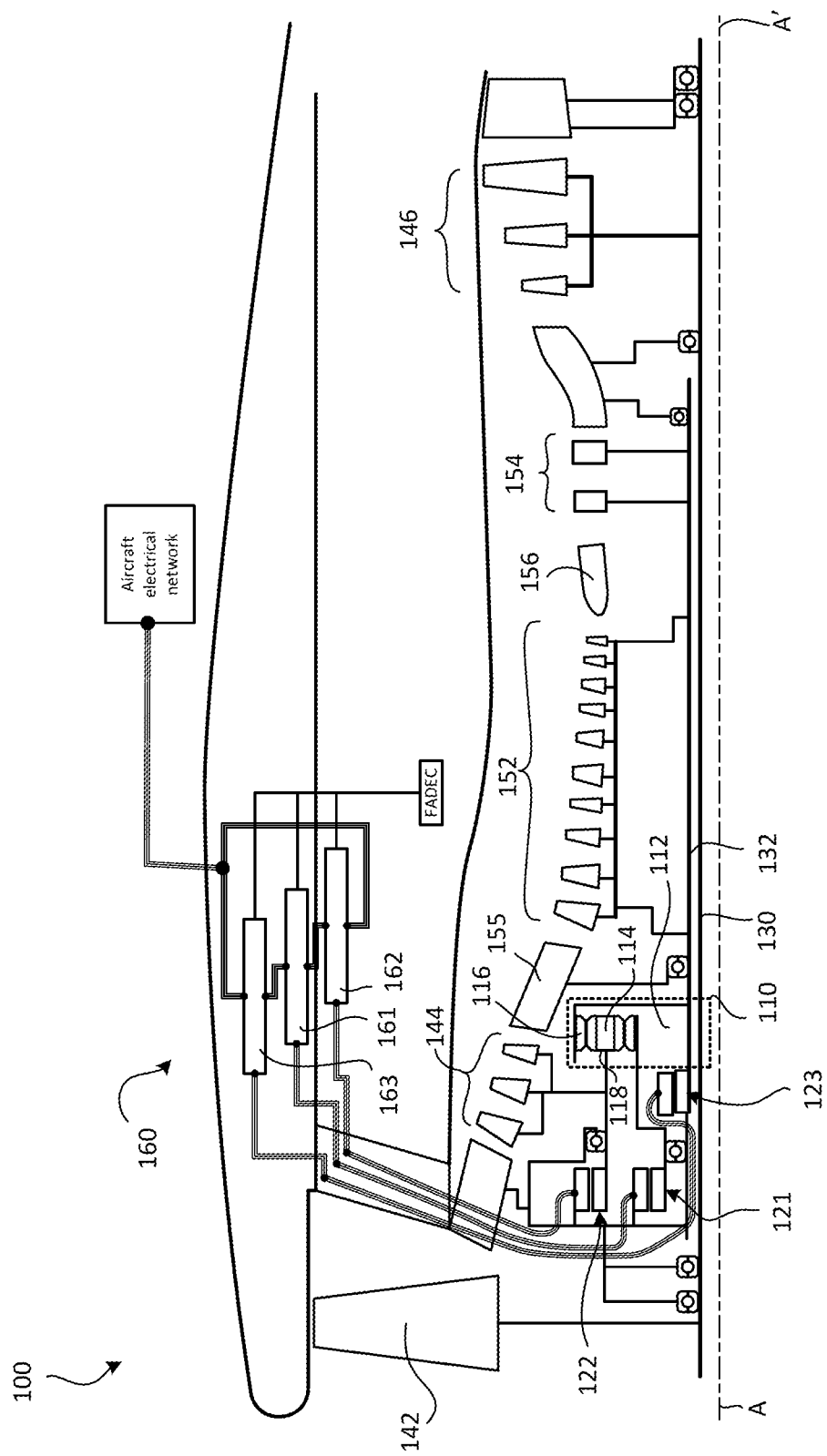
FIG. 2 is a schematic cross-sectional view of a gas turbine engine, in accordance with various embodiments.
Figure 3A:
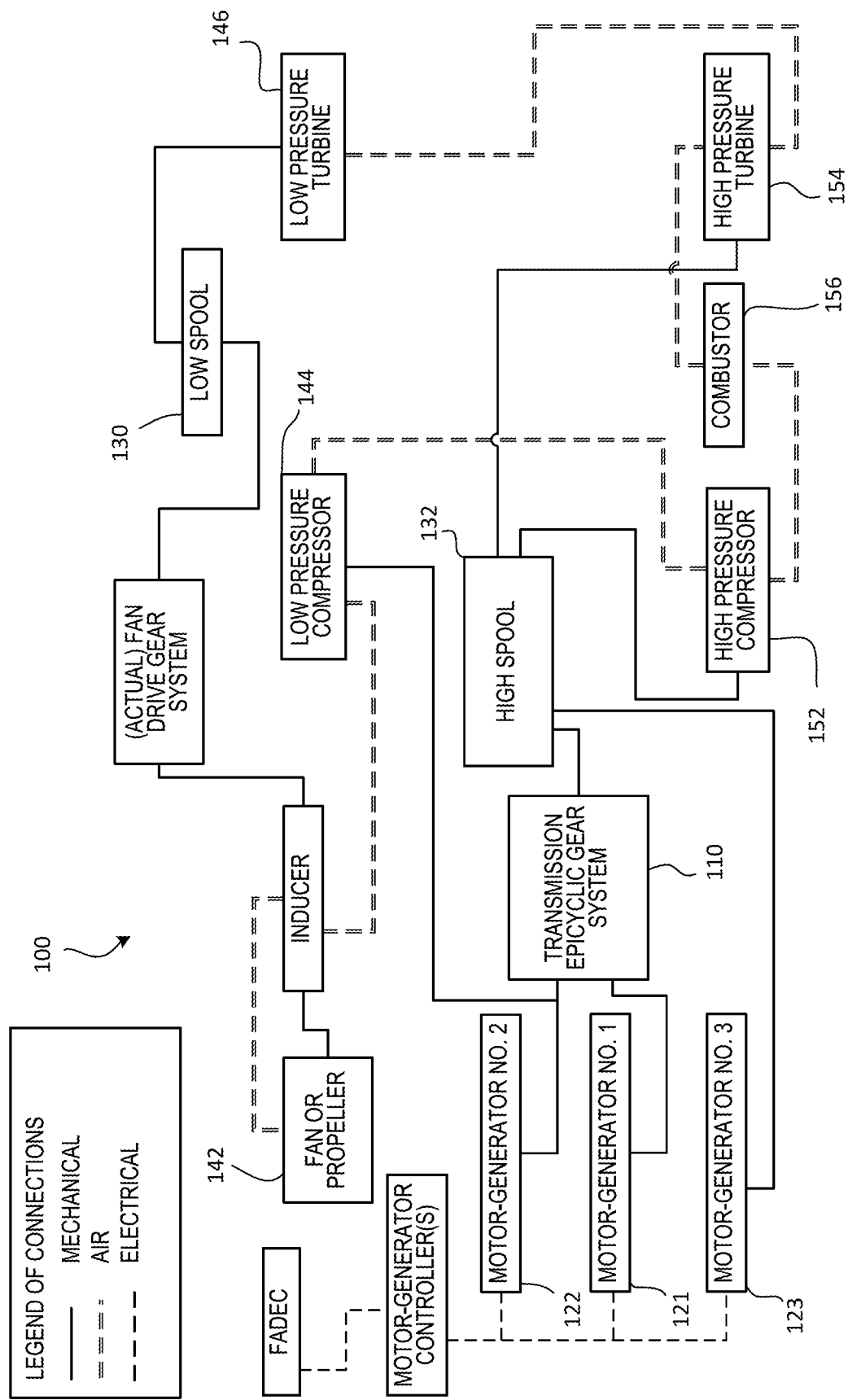
FIG. 3A is a schematic flow chart diagram of a gas turbine engine, in accordance with various embodiments.

In various embodiments, and with reference to FIGS. 2 and 3A, a gas turbine engine 100 having a plurality of motor-generators 121, 122, 123 is provided. The gas turbine engine 100 includes a low pressure compressor 144 that is independent of the low speed spool 130, according to various embodiments. The gas turbine engine 100 described in the remainder of this disclosure may differ from the gas turbine engine 20 shown and described above with reference to FIG. 1 because the low pressure compressor 144 (FIG. 2) is mechanically coupled to the high speed spool 132 via an epicyclic gear system 110 instead of the low pressure compressor 44 being mechanically coupled to the low speed spool 30 (FIG. 1). Said differently, the low pressure compressor 144 of the gas turbine engine 100 disclosed herein is not mechanically coupled to the low speed spool 130, according to various embodiments.

In various embodiments, and with continued reference to FIGS. 2 and 3A, the low speed spool 130 mechanically interconnects a low pressure turbine 146 and a fan/prop 142. The high speed spool 132 mechanically interconnects a high pressure turbine 154 and a high pressure compressor 152, according to various embodiments. The gas turbine engine 100 also includes an epicyclic gear system 110 mechanically coupled to the high speed spool 132, with the low pressure compressor 144 of the gas turbine engine 100 mechanically coupled to the high speed spool 132 via the epicyclic gear system 110, according to various embodiments. As used herein, the phrase "mechanically coupled" means connected, whether directly or indirectly, in power-transferring communication via mechanical components structures (gears, shafts, etc.).

Generally, the plurality of motor-generators 121, 122, 123 of the gas turbine engine 100, together with the epicyclic gear system 110, enable the gas turbine engine 100 to operate with improved efficiency, as the operating speeds of the low pressure compressor 144 and the high speed spool 132 may be independently changed to optimize stability and efficiency. More specifically, the operating speed of the low pressure compressor 144 may be controlled to optimize its own efficiency across the transient/dynamic speeds of the high speed spool 132. For example, the configuration of the gas turbine engine 100 disclosed herein may enable different speed 'matches' between the two spools 130, 132 depending on whether the aircraft is accelerating or decelerating (additional details included below with reference to FIG. 7). In various embodiments, the gas turbine engine 100 comprises an aircraft electrical network 160 that includes one or more controllers 161, 162, 163 and/or electrical connections between and among the plurality of motor-generators 121, 122, 123. The plurality of motor-generators facilitate power transfer between the low pressure compressor 144 and the high speed spool 132.

In various embodiments, and with reference to FIG. 3A, a schematic flow chart diagram of the gas turbine engine 100 is provided. The schematic flow chart diagram shows how the various components of the gas turbine engine 100 are interconnected mechanically, electrically, and/or via fluid communication. That is, as shown in the legend of FIG. 3A, various components of the gas turbine engine 100 are mechanically coupled together (as defined above), various components are coupled together in fluid (e.g., air) receiving/providing communication with each other, and various components are electrically coupled together.

In various embodiments, air enters the gas turbine engine 100 via the fan 142. The gas turbine engine 100 may optionally include an inducer. After the air enters through the fan 142, the air flows to the low pressure compressor 144, to the high pressure compressor 152, to the combustor 156, to the high pressure turbine 154, and finally to the low pressure turbine 146, after which the air flows out of the gas turbine engine via one or more exit ducts and/or exhaust nozzles, according to various embodiments. Regarding the mechanical interconnectivity of the components, the low speed spool 130 is mechanically interconnected between the fan 142 and the low pressure turbine 146. The fan 142 may be a direct drive fan, or the fan may be mechanically coupled to the low speed spool 130 via a gear system, in accordance with various embodiments. As mentioned above, the low pressure compressor 144 is not mechanically coupled to the low speed spool 130, but instead is mechanically coupled to the high speed spool 132 via the epicyclic gear system 110. That is, the high speed spool 132 may mechanically interconnect the high pressure turbine 154 and the high pressure compressor, and the low pressure compressor 144 may be geared off the high speed spool 132.

In various embodiments, and with continued reference to FIG. 3A, the plurality of motor-generators 121, 122, 123 are mechanically coupled to the high speed spool 132 and/or the epicyclic gear system 110. Generally, the plurality of motor-generators 121, 122, 123 are electrically connected to one or more controllers, and the collectively the motor-generators 121, 122, 123 are configured to facilitate power transfer between the low pressure compressor 144 and the high speed spool 132. In various embodiments, the gas turbine engine 100 includes a first motor-generator 121, a second motor-generator 122, and a third motor-generator 123. For example, the first motor-generator 121 may be mechanically coupled to a first member of the epicyclic gear system 110, the second motor 122 may be mechanically coupled to a second member of the epicyclic gear system, and the third motor-generator 123 may be mechanically coupled directly to the high speed spool 132. Additional details pertaining to the mechanical and electrical interconnectivity of the of the plurality of motor-generators are included below with reference to FIG. 4, and additional details relating to the method of power transfer are included below with reference to FIG. 7.

Figure 3B:
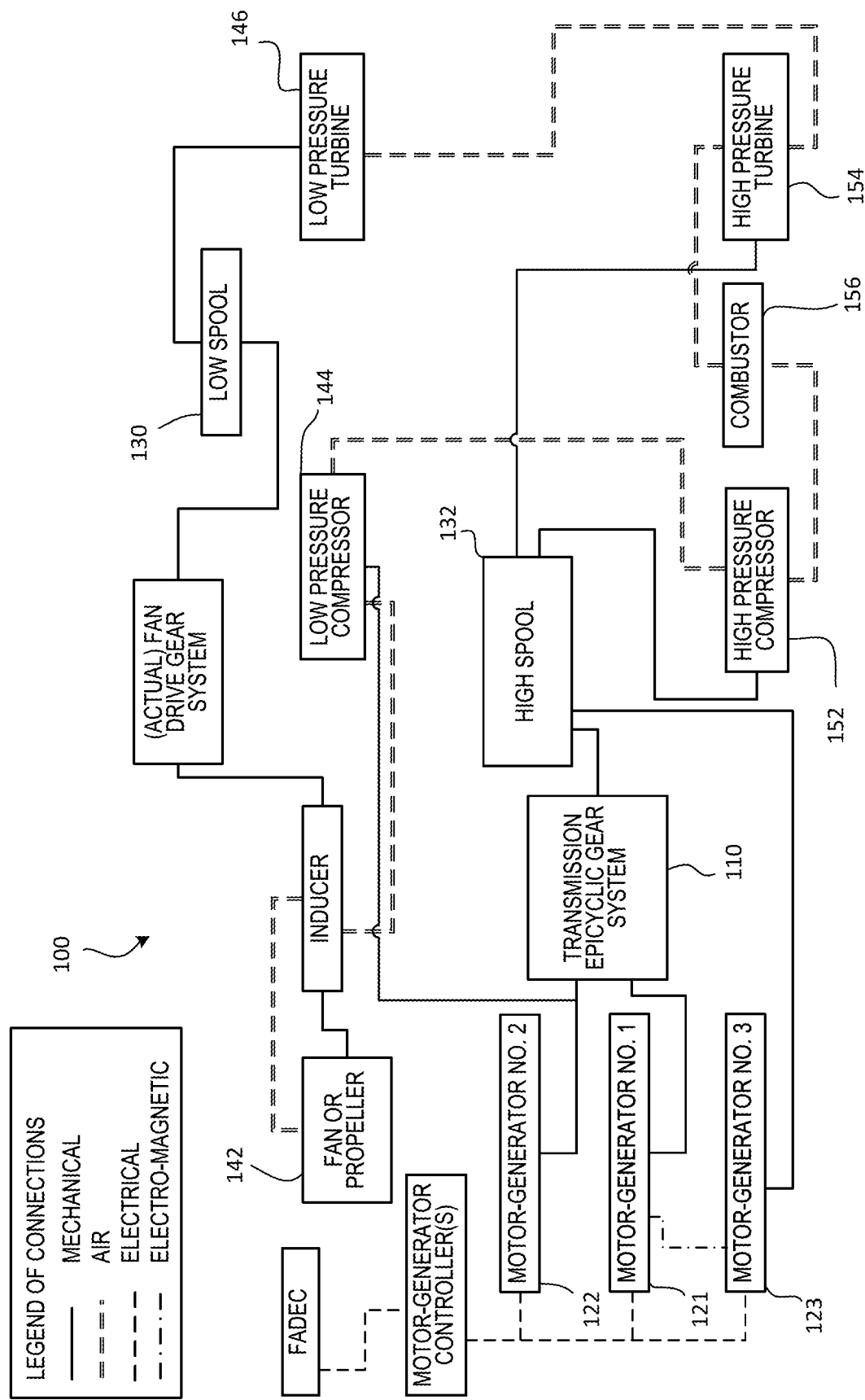
FIG. 3B is a schematic flow chart diagram of a gas turbine engine, in accordance with various embodiments.
Figure 3C:
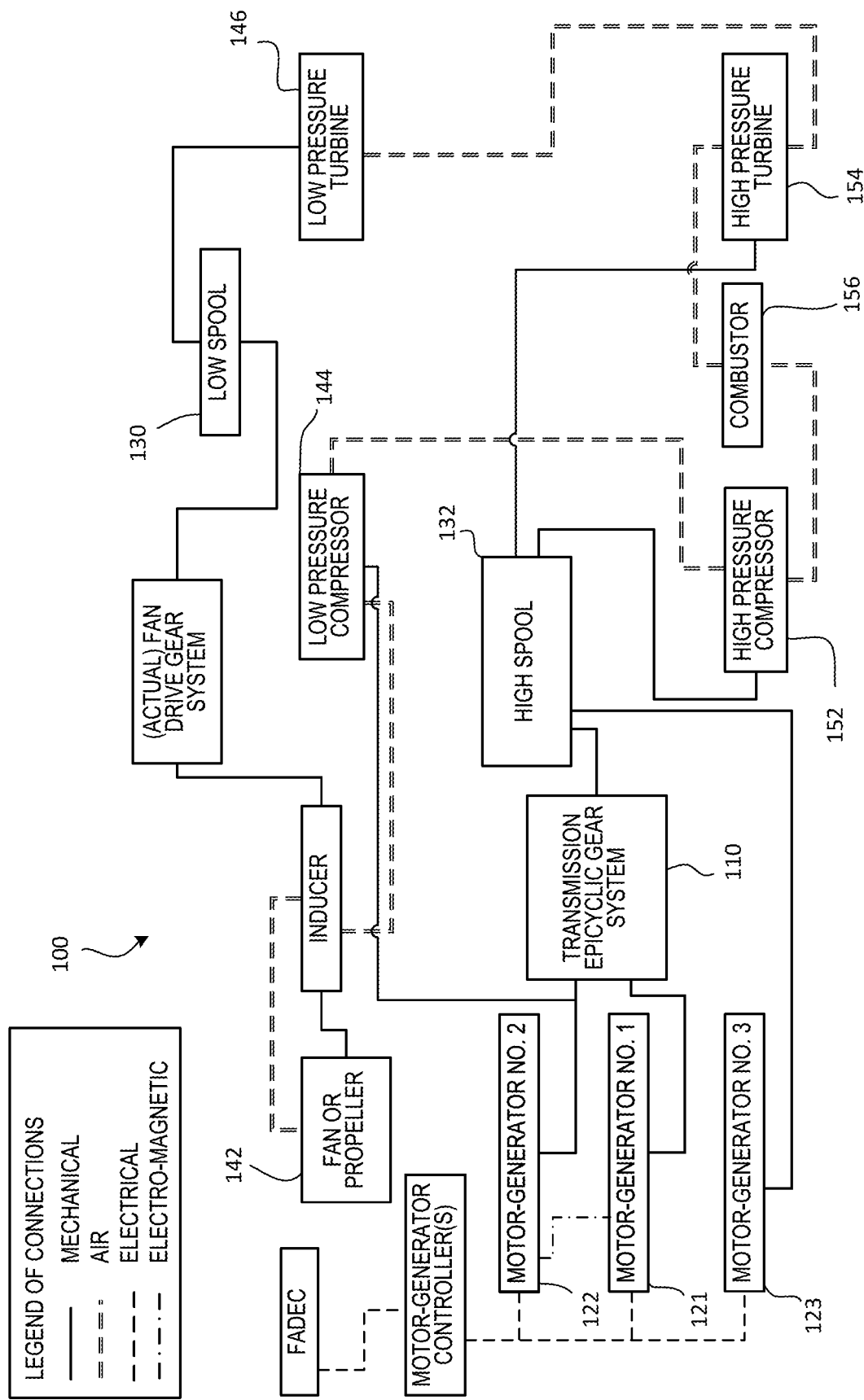
FIG. 3C is a schematic flow chart diagram of a gas turbine engine, in accordance with various embodiments.

In various embodiments, and with reference to FIGS. 3B and 3C, the plurality of motor-generators 121, 122, 123 may be electromagnetically coupled together as well. In various embodiments, the first motor-generator 121 may be electromagnetically coupled to the third motor-generator 123 (FIG. 3B). In various embodiments, the first motor-generator 121 may be electromagnetically coupled to the second motor-generator 122 (FIG. 3C). As used herein, the term "electromagnetically coupled" means the generation of voltages, electric currents, and magnetic fields by a first motor-generator and inducing the voltages and flow of electric currents and magnetic forces that produce torques upon the rotating members of a second motor-generator. The speed relationships of the rotating elements of the transmission epicyclic gear system 110 enable the specification of predictive control laws for control of the induced voltages, electric currents, magnetic forces, and torques that act upon the static windings and rotating windings of a second motor-generator. In various embodiments, two of the motor-generators are electromagnetically coupled together by virtue of their respective stator windings being adjacent to each other. In various embodiments, two of the motor-generators are electromagnetically coupled together by virtue of their respective stator windings being integrated into a single, common stator winding that is shared by the two motor-generators. Additional details pertaining to electromagnetic sharing between the motor-generators are included below with reference to FIGS. 5A, 5B, 6A, and 6B.

Figure 4:
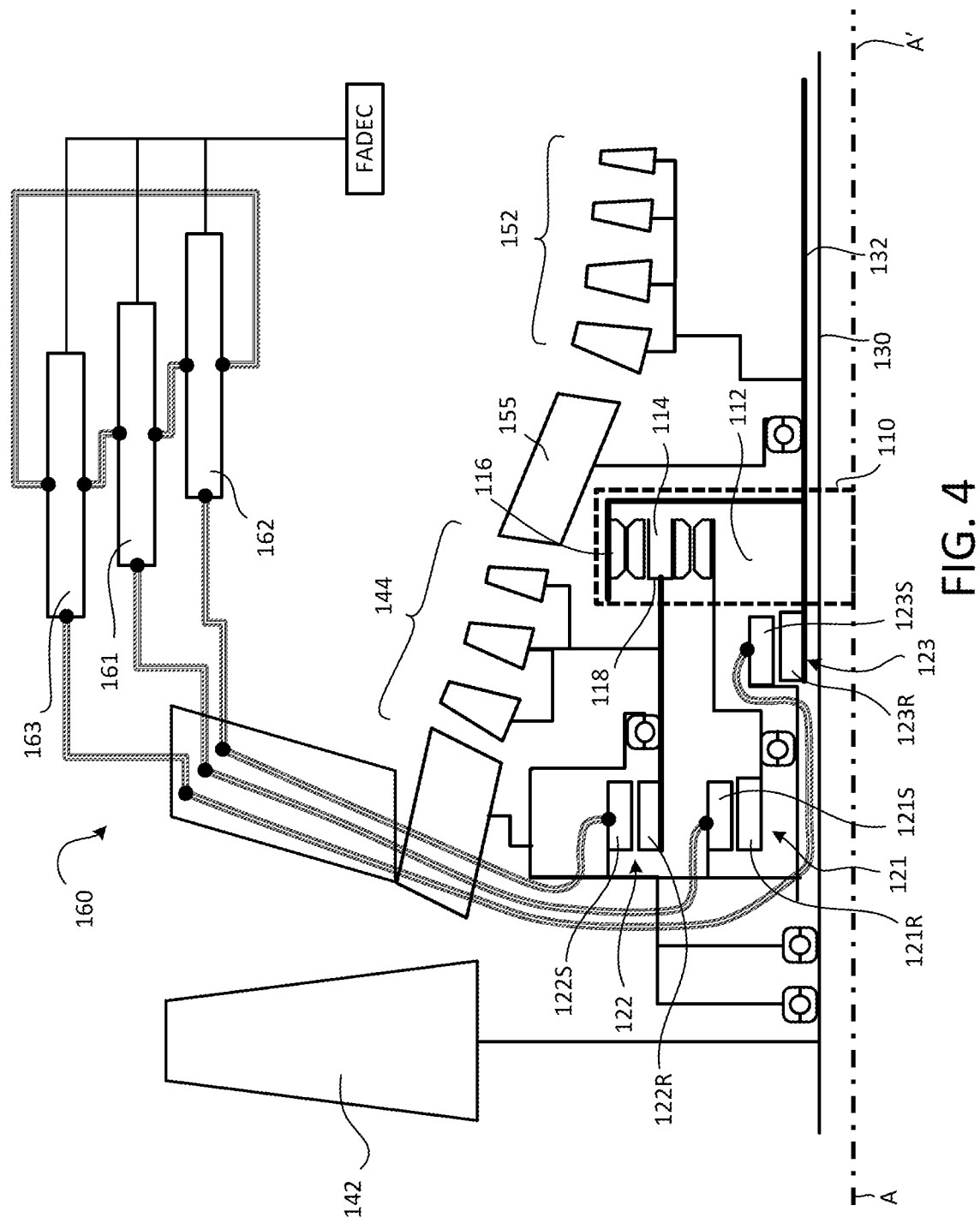
FIG. 4 is a schematic cross-sectional view of a gas turbine engine, in accordance with various embodiments.

In various embodiments, and with reference to FIG. 4, a magnified view of a portion of the schematic depiction of the gas turbine engine 100 is provided. In various embodiments, the epicyclic gear system 110 is forward of a bearing of a vane/duct 155 that is disposed between the low pressure compressor 144 and the high pressure compressor 152. In various embodiments, the plurality of motor-generators 121, 122, 123 are disposed forward of the epicyclic gear system 110. In various embodiments, the epicyclic gear system 110 is mechanically coupled to the high speed spool 132.

In various embodiments, the epicyclic gear system 110 includes a sun gear 112, a ring gear 116, a plurality of planet gears 114, and a gear carrier 118 coupled to the plurality of planet gears, with the plurality of planet gears 114 being disposed between the sun gear 112 and the ring gear 116. The ring gear 116 of the epicyclic gear system 110 may be mechanically coupled to the high speed spool 132, as shown in FIG. 4. In various embodiments, the high speed spool may be mechanically coupled to the sun gear. The plurality of motor-generators 121, 122, 123 may be mechanically coupled to at least one of the high speed spool 132 and the epicyclic gear system 110. For example, the first and second motor-generators 121, 122 may be mechanically coupled to the sun gear 112 and the gear carrier 118, respectively, and the third motor-generator may be mechanical coupled to the high speed spool 132.

In various embodiments, the low pressure compressor 144 is mechanically coupled to the gear carrier 118. Accordingly, the low pressure compressor 144 and the second motor-generator 122 may both be mechanically coupled to the gear carrier 118. With two of the three motor-generators mechanically coupled to the epicyclic gear system 110 and the third mechanically coupled to the high speed spool 132, electrical power transfer between the electrically coupled motor-generators may facilitate mechanical power transfer between the high speed spool 132 and the low pressure compressor 144, thereby enabling the aforementioned operating flexibility to improve the efficiency and stability of the gas turbine engine 100.

In various embodiments, and with continued reference to FIG. 4, each motor-generator may include a rotor winding and a stator winding. That is, the first motor-generator 121 may include a first rotor winding 121R and a first stator winding 121S, the second motor-generator 122 may include a second rotor winding 122R and a second stator winding 122S, and the third motor-generator 123 may include a third rotor winding 123R and a third stator winding 123S. In various embodiments, the respective rotor windings 121R, 122R, 123R are mechanically coupled to components of the epicyclic gear system 110 or the high speed spool 132.

In various embodiments, the aircraft electrical network 160 of the gas turbine engine 100 includes the first motor-generator 121, which is mechanically coupled to a first member of the epicyclic gear system 110 (e.g., the sun gear 112), the second motor-generator 122, which is mechanically coupled to a second member of the epicyclic gear system 110 (e.g., the gear carrier 118), and the third motor-generator 123, which is mechanically coupled to the high speed spool 132. In various embodiments, the aircraft electrical network 160 may also include one or more controllers 161, 162, 163. For example, each motor-generator may have its own controller, and the controllers 161, 162, 163 may be electronically coupled to a full authority digital electronic control (FADEC) system of the aircraft.

Figure 5A:
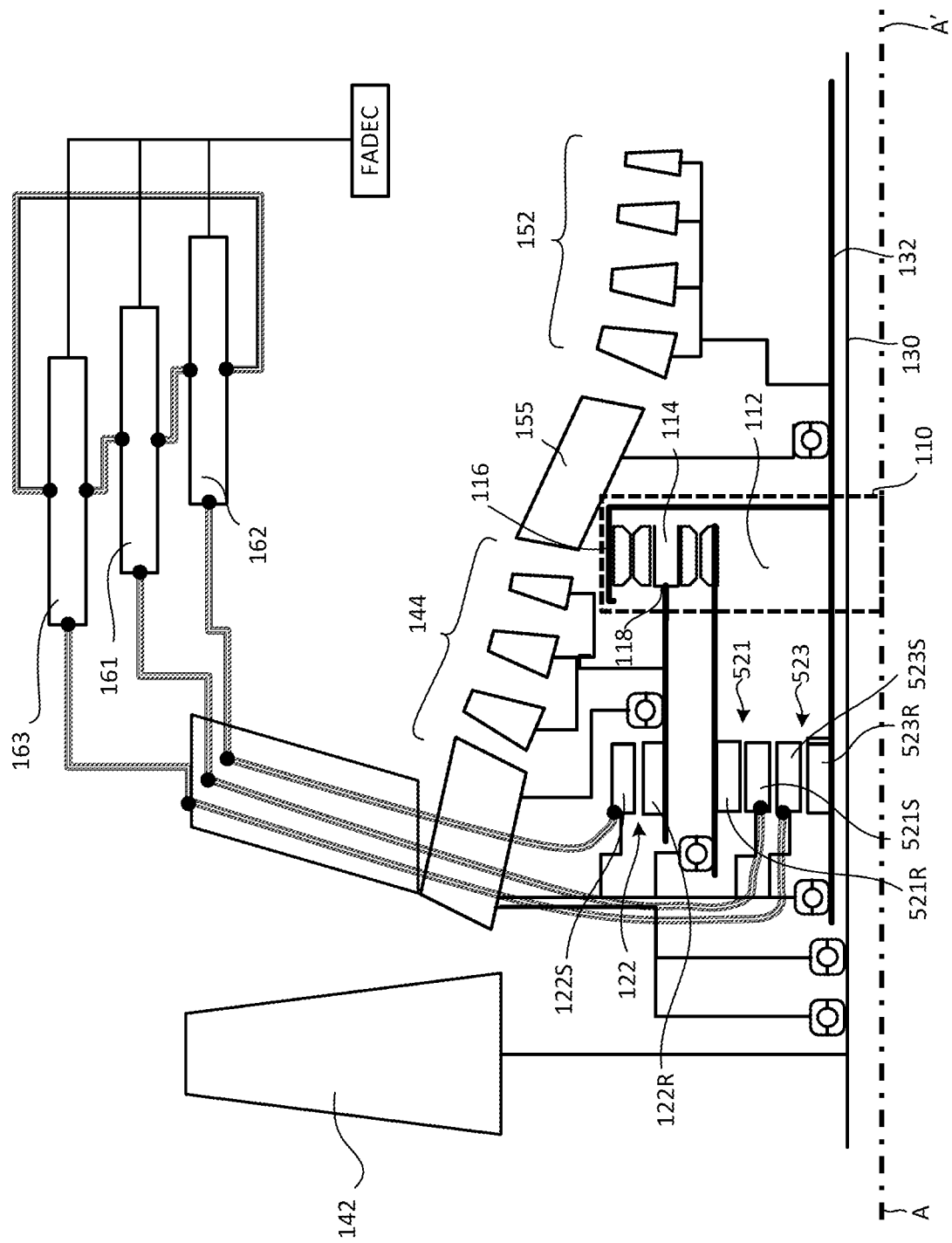
FIG. 5A is a schematic cross-sectional view of a gas turbine engine, in accordance with various embodiments.
Figure 5B:
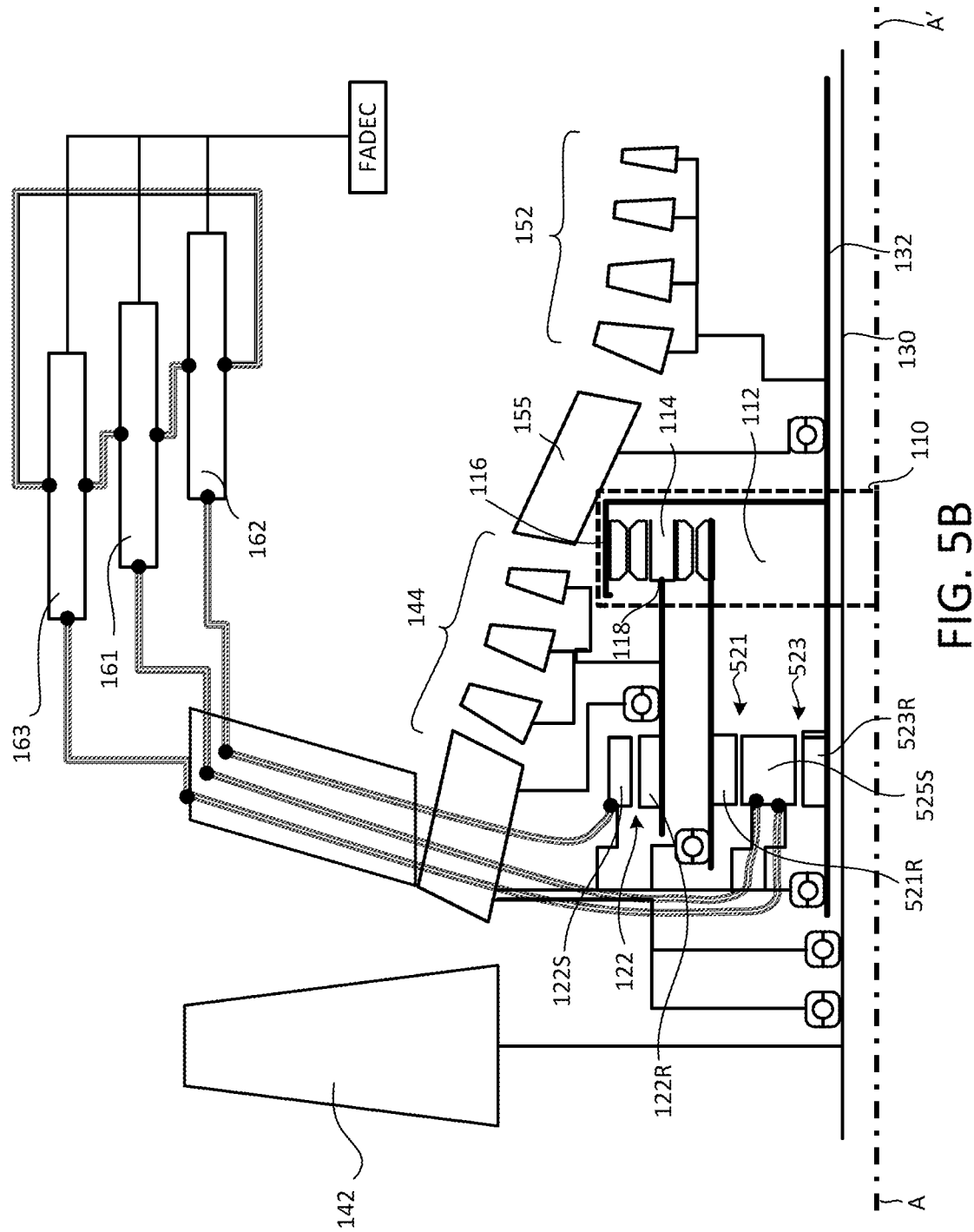
FIG. 5B is a schematic cross-sectional view of a gas turbine engine, in accordance with various embodiments.

In various embodiments, and with reference to FIG. 5A, the first motor-generator 521 includes a first rotor winding 521R and a first stator winding 521S and the third motor-generator 523 includes a third rotor winding 523R and a third stator winding 523S. The first stator winding 521S and the third stator winding 523S may be disposed radially adjacent to each other such that the first stator winding 521S and the third stator winding 523S are electromagnetically coupled. In various embodiments, and with reference to FIG. 5B, instead of having separate stator windings, the first motor-generator 521 and the third motor-generator 523 share a single, common stator winding 525S. That is, the first stator winding and the third stator winding may be integrated together into a single stator winding, such that the first and third motor-generators 521, 523 are electromagnetically coupled together.

Figure 6A:
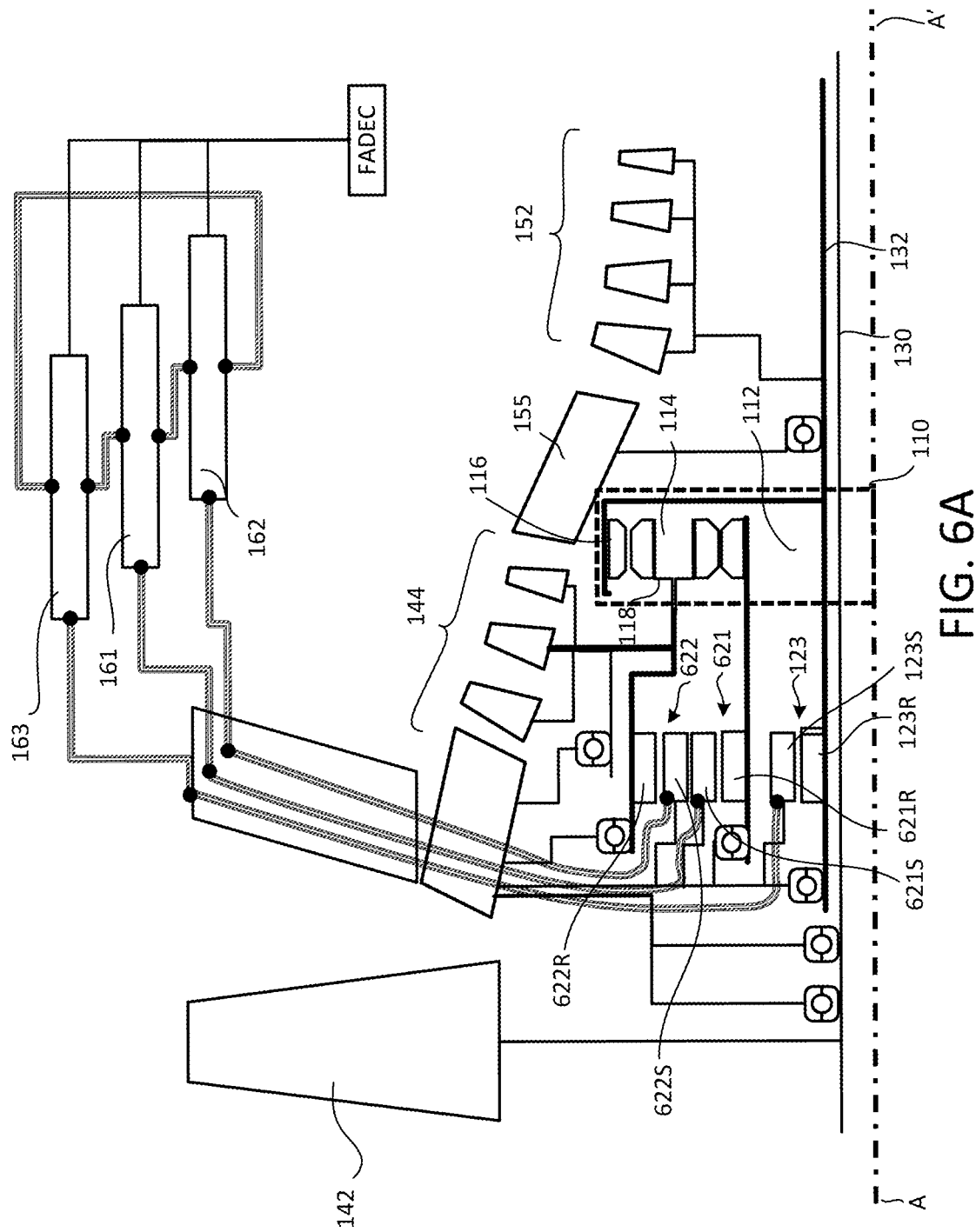
FIG. 6A is a schematic cross-sectional view of a gas turbine engine, in accordance with various embodiments.

In various embodiments, and with reference to FIG. 6A, the first motor-generator 621 includes a first rotor winding 621R and a first stator winding 621S and the second motor-generator 622 includes a second rotor winding 622R and a second stator winding 622S. The first stator winding 621S and the second stator winding 622S may be disposed radially adjacent to each other such that the first stator winding 621S and the second stator winding 622S are electromagnetically coupled. In various embodiments, and with reference to FIG. 6B, instead of having separate stator windings, the first motor-generator 621 and the second motor-generator 622 share a single, common stator winding 625S. That is, the first stator winding and the second stator winding may be integrated together into a single stator winding, such that the first and second motor-generators 621, 622 are electromagnetically coupled together.

Figure 7:
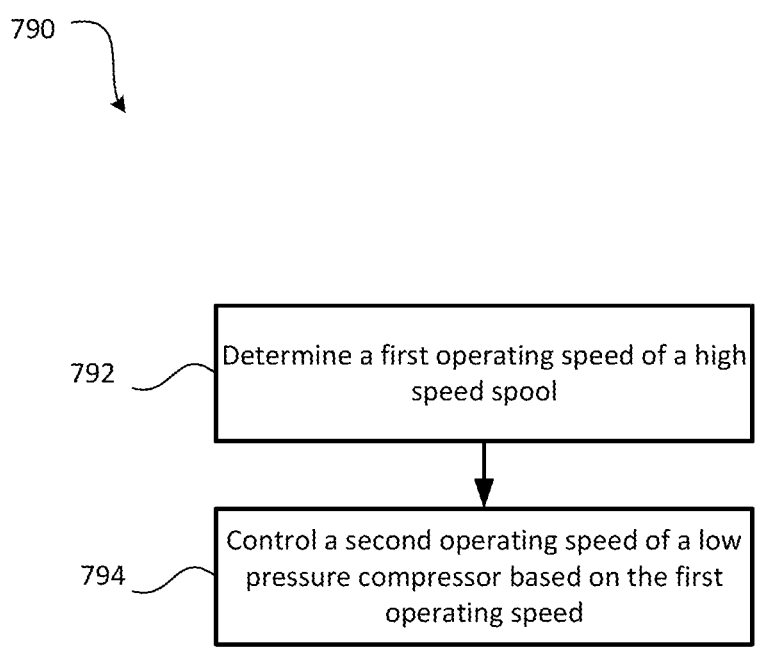
FIG. 7 is a schematic flow chart diagram of a method of controlling a gas turbine engine, in accordance with various embodiments.

In various embodiments, and with reference to FIG. 7, a method 790 of operating a gas turbine engine is provided. The method 790 includes determining a first operating speed of a high speed spool of the gas turbine engine at step 792, according to various embodiments. The method 790 may also include controlling a second operating speed of a low pressure compressor of the gas turbine engine based on the first operating speed at step 794. In various embodiments, the low pressure compressor is mechanically independent of a low speed spool of the gas turbine engine.

Figure 8:
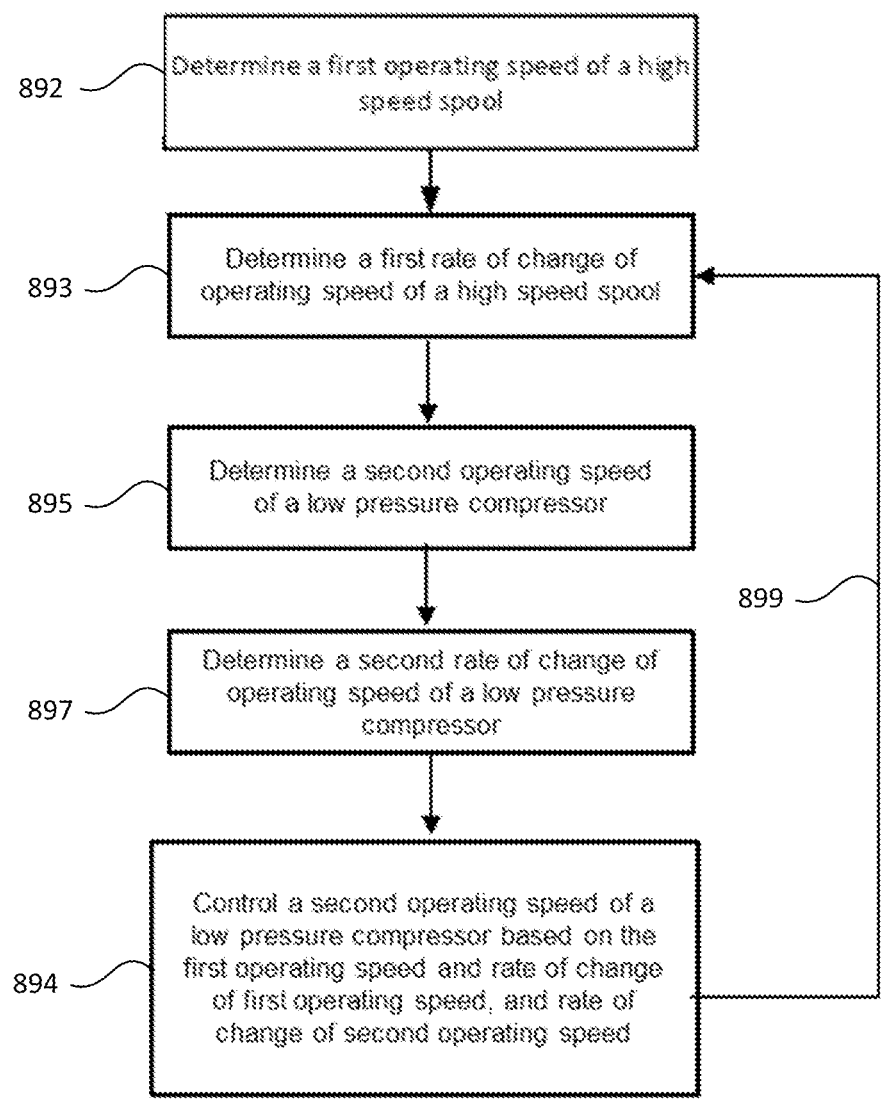
FIG. 8 is a schematic flow chart diagram of a method of controlling a gas turbine engine, in accordance with various embodiments.

With reference to FIGS. 4 and 8, for the initiation of the acceleration transient, a fraction of the mechanical rotational energies of the low pressure compressor 144 and the gear carrier 118, and the sun gear 112 are respectively transferred via motor-generator 122, and motor-generator 121, to motor generator 123, to improve the stability of the high pressure compressor 152 and increase the rotational speed of high speed spool 132 at step 892, according to various embodiments. As the acceleration transient progresses, fuel flow rate may be ramped-up and fuel may be combusted in combustor 156. Thermal energy from the combustion is converted to rotational energy by high pressure turbine 154 and the rate of change of high speed spool increases at step 893. The increase in the rate of change of the speed of the high speed spool enables a fraction of the high speed spool 132 mechanical rotational energy to be transferred via motor-generator 123 and ring gear 116 to the low pressure compressor 144 at step 895 to increase the rotational speed of low pressure compressor 144 at step 897 and increase core flow C and increase pressure into the high pressure compressor 152, according to various embodiments. At step 894, the increased core flow and increased pressure progressively increase the power of the low pressure turbine 146 that drives the fan 142 to higher rotational speed and more thrust output by gas turbine engine 100 at feedback step 899, in accordance with various embodiments.

For the deceleration transient, fuel flow is reduced and less thermal energy is converted to rotational energy by high pressure turbine 154 at step 892, according to various embodiments. The negative rate of change of the speed of high speed spool 132 at step 893 may progressively slow the rotational speed of high pressure compressor 152 and the flow rate capacity of high pressure compressor 152. The core flow C and pressure output by low pressure compressor 144 at step 895 may be controllably matched to a reduced core flow C of the high pressure compressor 152. The rate of change of rotational speed of the low pressure compressor 144 at step 897 must decrease faster than the rate of change of rotational speed of high pressure compressor 152 at step 893 to maintain stability of the low pressure compressor 144, according to various embodiments via feedback step 899. In various embodiments, a fraction of the mechanical rotational energies of the low pressure compressor 144 and the gear carrier 118, and the sun gear 112 are respectively transferred via motor-generator 122, and motor-generator 121, to motor generator 123, to increase the rate of deceleration of the low pressure compressor 144 at step 897 and reduce the rate of deceleration of the high speed spool 132. At step 894 the decreased core flow C and decreased pressures of the low pressure compressor 144 and high pressure compressor 152 progressively decrease the power of the low pressure turbine 146 and slows the fan 142 to lower rotational speed and reduced thrust output by gas turbine engine 100 at feedback step 899, according to various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of operating a gas turbine engine, the method comprising:
   determining, by one or more processors, a first operating speed of a high speed spool of the gas turbine engine; and
   based on the first operating speed, controlling, by the one or more processors, a second operating speed of a low pressure compressor of the gas turbine engine, wherein the low pressure compressor is mechanically independent of a low speed spool of the gas turbine engine, wherein:
- determining the first operating speed of the high speed spool comprises determining a first rate of change of the first operating speed, and
- in response to the first rate of change increasing, the second operating speed of the low pressure compressor of the gas turbine engine is increased via a motor generator.

2. The method of claim 1, wherein a fraction of mechanical rotational energy of the high speed spool is transferred via the motor generator to the low pressure compressor.

3. A method of operating a gas turbine engine, the method comprising:
- determining, by one or more processors, a first operating speed of a high speed spool of the gas turbine engine; and
- based on the first operating speed, controlling, by the one or more processors, a second operating speed of a low pressure compressor of the gas turbine engine, wherein the low pressure compressor is mechanically independent of a low speed spool of the gas turbine engine, wherein:
  - determining the first operating speed of the high speed spool comprises determining a first rate of change of the first operating speed, and
  - in response to the first rate of change decreasing, a second rate of change of the second operating speed of the low pressure compressor of the gas turbine engine is reduced faster than the first rate of change of the first operating speed.

4. The method of claim 3, wherein a fraction of a mechanical rotational energy of the low pressure compressor, a gear carrier, and a sun gear are respectively transferred via a first motor generator and a second motor generator to a third motor generator to increase a rate of deceleration of the low pressure compressor.

5. The method of claim 4, wherein in response to the fraction of the mechanical rotational energy being transferred, a power of a low pressure turbine is reduced to generate a reduced thrust output of the gas turbine engine.

6. A control system including a tangible, non-transitory computer-readable storage medium having instructions stored thereon that, in response to execution by one or more processors, causes the one or more processors to perform operations comprising:
- determining, by the one or more processors, a first operating speed of a high speed spool of a gas turbine engine; and
- based on the first operating speed, controlling, by the one or more processors, a second operating speed of a low pressure compressor of the gas turbine engine, wherein the low pressure compressor is mechanically independent of a low speed spool of the gas turbine engine, wherein:
  - the controlling the second operating speed further comprises determining, by the one or more processors, a first rate of change of the first operating speed, and
  - in response to the one or more processors determining the first rate of change is increasing, commanding, by the one or more processors, a first motor generator and a second motor generator to transfer a first fraction of a first mechanical rotational energy of the low pressure compressor to a third motor generator to improve a stability of a high pressure compressor.

7. The control system of claim 6, wherein in response to the one or more processors determining the first rate of change is decreasing, commanding, by the one or more processors, the first motor generator and the second motor generator to transfer a second fraction of a second mechanical rotational energy of the low pressure compressor to the third motor generator to increase a first rate of deceleration of the low pressure compressor and reduce a second rate of deceleration of the high speed spool.

8. The control system of claim 7, wherein:
- the first motor generator is mechanically coupled to a sun gear of an epicyclic gear system,
- the second motor generator is mechanically coupled to a gear carrier of the epicyclic gear system, and
- the third motor generator is mechanically coupled to the high speed spool.

9. The control system of claim 6, wherein in response to the commanding the first motor generator and the second motor generator to transfer the first fraction of the first mechanical rotational energy of the low pressure compressor to the third motor generator, the first fraction of the first mechanical rotational energy is transferred to the third motor generator through an epicyclic gear system.

10. The gas turbine engine comprising the control system of claim 6, wherein:
- the control system is configured for electrical communication with the first motor generator, the second motor generator, and the third motor generator, and
- the low pressure compressor is mechanically independent of the low speed spool of the gas turbine engine.

11. The gas turbine engine of claim 10, further comprising the first motor generator, the second motor generator, and the third motor generator, wherein:
- the first motor generator is configured to be mechanically coupled to a sun gear of an epicyclic gear system,
- the second motor generator is configured to be mechanically coupled to a gear carrier of the epicyclic gear system, and
- the third motor generator is configured to be mechanically coupled to the high speed spool.

12. The gas turbine engine of claim 10, wherein in response to the one or more processors determining the first rate of change is decreasing, commanding, by the one or more processors, the first motor generator and the second motor generator to transfer a second fraction of a second mechanical rotational energy of the low pressure compressor to the third motor generator to increase a first rate of deceleration of the low pressure compressor and reduce a second rate of deceleration of the high speed spool.

13. The gas turbine engine of claim 10, wherein in response to the commanding the first motor generator and the second motor generator to transfer the first fraction of the first mechanical rotational energy to the third motor generator, the first fraction of the first mechanical rotational energy is transferred to the third motor generator through an epicyclic gear system.

14. The gas turbine engine of claim 10, wherein the control system is configured to control an epicyclic gear system through the first motor generator, the second motor generator, and the third motor generator.

* * * * *